United States Patent
Ailaney et al.

(10) Patent No.: US 8,924,251 B2
(45) Date of Patent: Dec. 30, 2014

(54) SYSTEMS AND METHODS FOR PROVIDING ONE OR MORE PAGES FROM AN ELECTRONIC DOCUMENT

(75) Inventors: Manjesh Singh Ailaney, Fremont, CA (US); Gerald Dan Hutcheson, Palo Alto, CA (US)

(73) Assignee: VLSI Research Inc., San Jose, CA (US)

( * ) Notice: Subject to any disclaimer, the term of this patent is extended or adjusted under 35 U.S.C. 154(b) by 217 days.

(21) Appl. No.: 12/966,938

(22) Filed: Dec. 13, 2010

(65) Prior Publication Data
US 2011/0258043 A1   Oct. 20, 2011

(51) Int. Cl.
G06Q 30/00 (2012.01)
G06Q 30/02 (2012.01)
G06Q 10/10 (2012.01)

(52) U.S. Cl.
CPC ............ *G06Q 30/0241* (2013.01); *G06Q 10/10* (2013.01); *G06Q 30/0251* (2013.01)
USPC ....................................................... 705/14.4

(58) Field of Classification Search
CPC ................................................ G06Q 30/0241
USPC ....................................................... 705/14.4
See application file for complete search history.

(56) References Cited

U.S. PATENT DOCUMENTS

| | | | |
|---|---|---|---|
| 6,449,718 B1 * | 9/2002 | Rucklidge et al. ............ | 713/168 |
| 6,662,218 B2 * | 12/2003 | Mighdoll et al. ............. | 709/219 |
| 8,112,361 B2 * | 2/2012 | Golan et al. .................... | 705/54 |
| 8,213,909 B2 | 7/2012 | Lee et al. | |
| 8,230,037 B2 * | 7/2012 | Story et al. .................... | 709/217 |
| 8,520,224 B2 * | 8/2013 | Nielsen et al. ............... | 358/1.11 |
| 8,731,532 B2 | 5/2014 | Ailaney et al. | |
| 8,798,366 B1 * | 8/2014 | Jones et al. .................... | 382/177 |
| 2002/0107759 A1 * | 8/2002 | An .................................. | 705/26 |
| 2003/0028432 A1 * | 2/2003 | Troyansky et al. ............. | 705/14 |
| 2008/0249942 A1 * | 10/2008 | Barrs et al. ...................... | 705/51 |
| 2009/0157823 A1 | 6/2009 | Price, III | |
| 2010/0325213 A1 | 12/2010 | Harris, III | |
| 2011/0159861 A1 | 6/2011 | Pratt et al. | |
| 2012/0011001 A1 * | 1/2012 | Gross et al. ................. | 705/14.66 |
| 2012/0198330 A1 * | 8/2012 | Koppel et al. ................. | 715/251 |
| 2014/0099919 A1 | 4/2014 | Ailaney et al. | |

OTHER PUBLICATIONS

"AmazonKindle User's Guide." amazon.com. Amazon.com, Inc., Web. 2004-2011. <http://kindle.s3.amazonaws.com/Kindle_User%27s_Guide_English.pdf>.

(Continued)

*Primary Examiner* — James W Myhre
(74) *Attorney, Agent, or Firm* — Carr & Ferrell LLP

(57) ABSTRACT

Systems and methods for providing one or more pages of an electronic document are provided herein. Some of the methods may include evaluating one or more pages obtained from an electronic document to determine at least one of a pagination and an order for each of the one or more pages, reducing the size of each of the one or more pages, while utilizing at least a portion of the pagination of the each of the one or more pages, associating the one or more pages together according to the determined order, and providing at least one of the one or more pages to a network-enabled computing system upon receiving a request to obtain at least one page of the electronic document from the network-enabled computing system.

33 Claims, 9 Drawing Sheets

(56) References Cited

OTHER PUBLICATIONS

"Apple iBooks Chapter 16: iBooks for the iPad ." Apple.com. Apple, Inc., Web. 2010. < http://manuals.info.apple.com/en_US/iPad_iOS4_User_Guide.pdf>.

"Why you should use SlideShare?" SlideShare: Present Yourself. SlideShare, Inc., Web. 2011. website: <http://www.slideshare.net/about>.

"Not Yet on SlideShare?" SlideShare: Present Yourself. SlideShare, Inc., Web. 2011. 24 slides: <http://www.slideshare.net/about>.

* cited by examiner

SYSTEMS AND METHODS FOR PROVIDING ONE OR MORE PAGES FROM AN ELECTRONIC DOCUMENT

FIELD OF THE INVENTION

The present invention relates generally to systems and methods for providing one or more pages of an electronic document, and more specifically, but not by way of limitation, to systems and methods adapted to provide one or more pages from an electronic document, along with methods for dynamically adjusting each page for optimal viewing, and extracting the full text of the one or more pages and determine keywords that are utilized as the basis for providing targeted advertisements.

SUMMARY OF THE INVENTION

According to some embodiments, the present invention may be directed to methods for providing one or more pages of an electronic document that include (a) evaluating one or more pages obtained from an electronic document to determine at least one of a pagination and an order for each of the one or more pages; (b) reducing the size of each of the one or more pages, while utilizing at least a portion of the pagination of the each of the one or more pages; (c) associating the one or more pages together according to the determined order; and (d) providing at least one of the one or more pages to a network-enabled computing system upon receiving a request to obtain at least one page of the electronic document from the network-enabled computing system.

According to other embodiments, the present invention may be directed to systems for providing one or more pages of an electronic document including (a) a memory for storing a document processing application; and (b) a processor for executing the document processing application. The document processing application may include (i) an analysis module adapted to evaluate the one or more pages obtained from an electronic document to determine at least one of a pagination and an order for each of the one or more pages; and (ii) a pagination module adapted to (1) reduce the size of each of the one or more pages, while utilizing at least a portion of the pagination of the each of the one or more pages; and (2) associate the one or more pages together according to the determined order; and (iii) an interface module adapted to provide at least one view of the one or more pages to a network-enabled computing system.

According to additional embodiments, the present invention may be directed to a non-transitory computer readable storage medium having a document processing application embodied thereon, the document processing application executable by a processor of a computing system to perform a method for providing one or more pages of an electronic document that includes the steps of (a) evaluating one or more pages obtained from an electronic document to determine at least one of a pagination and an order for each of the one or more pages; (b) reducing the size of each of the one or more pages, while utilizing at least a portion of the pagination of the each of the one or more pages; (c) associating the one or more pages together according to the determined order; and (d) providing at least one of the one or more pages to a network-enabled computing system upon receiving a request to obtain at least one page of the electronic document from the network-enabled computing system.

According to some embodiments, the present invention may be directed to electronic document reader devices adapted to provide one or more pages of an electronic document. Some electronic document reader devices may include: (a) a memory for storing a document processing application; and (b) a processor for executing the document processing application. The document processing application may include (i) an interface module adapted to receive requests to obtain one or more pages of an electronic document; (ii) a communications module adapted to locate and obtain the requested electronic document from a server; (iii) an analysis module adapted to evaluate one or more pages obtained from the electronic document to determine at least one of a pagination and an order for each of the one or more pages; and (iv) a pagination module adapted to (1) reduce the size of each of the one or more pages, while utilizing at least a portion of the pagination of the each of the one or more pages; and (2) associate the one or more pages according to the determined order; and (v) wherein the interface module is further adapted to generate a view of at least one page; (c) a transceiver for outputting requests to obtain one or more pages of an electronic document and receive at least one view of at least one page from the interface module; and (d) a display adapted to output the view generated by the interface module of the document processing application.

DETAILED DESCRIPTION OF EXEMPLARY EMBODIMENTS

Figure 1:
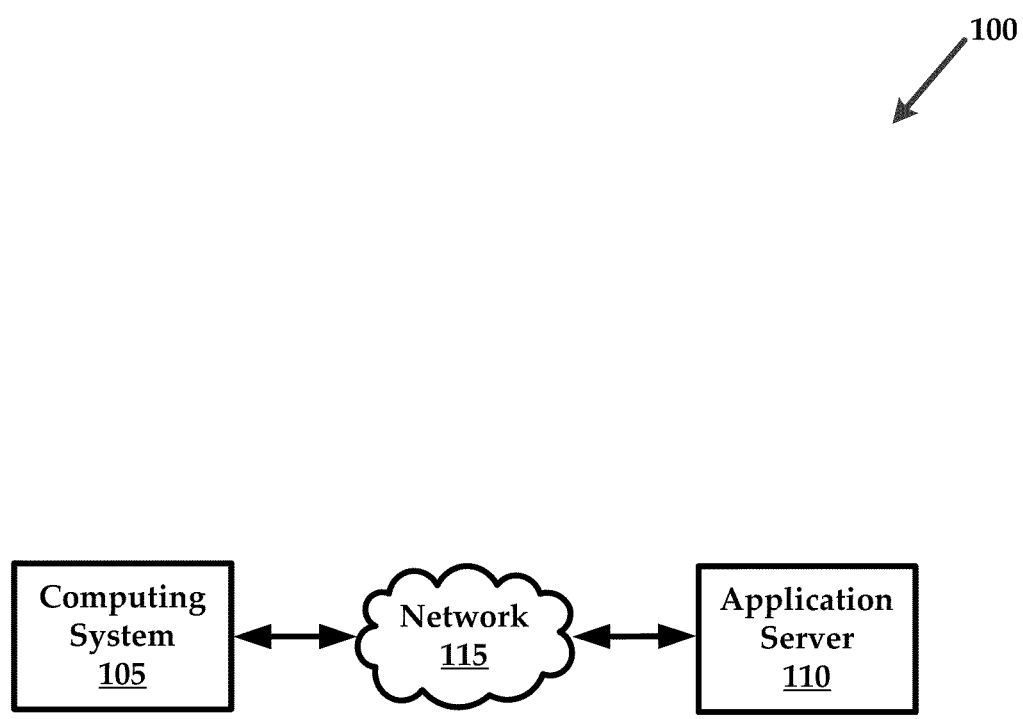
FIG. 1 is a block diagram of an exemplary architecture constructed in accordance with various embodiments of the present technology.

Systems and methods disclosed herein and constructed in accordance with the present technology may provide uniform views of pages of electronic documents over a variety of screen sizes, including, but not limited to, large desktop monitors, laptop screens, televisions, tablet screens, and mobile device screens. Exemplary methods of the present invention may provide one or more pages of electronic documents seamlessly and efficiently so that users experience no delay that is substantially longer in duration than what they would experience turning the page of a physical book or magazine. Moreover, the systems and methods disclosed herein may benefit several unique types of users and/or experiences.

For website applications, uploads of electronic documents are simplified because the systems and methods may be adapted to cooperate with the most common file formats without the user needing to convert the electronic document to an intermediate format, like a portable document file (P.D.F.). Common types of file formats include, but are not limited to, .doc, .ppt, .pps, .txt, and .xls, in addition to .pdf. According to some embodiments, the systems and methods may be adapted to separate, fragment, or otherwise divide an electronic document into one or more pages. The one or more pages may be reduced in size by saving them as separate image files (e.g., JPEG, TIFF, PNG, etc.). This type of conversion reduces the size of the individual pages so they may be more quickly downloaded, a function which is especially important for mobile environments, as most mobile devices are limited by wireless bandwidth restrictions. The systems and methods provided herein may also recognize the original pagination of individual pages, as well as page orientation (e.g., either landscape or portrait) and rotation, and correctly orient each displayed page for the reader, thereby creating a seamless viewing experience.

Systems and methods disclosed herein may ensure that readers viewing an electronic document, via a webpage, wireless device, or electronic reader device, are not required to wait for large portions of an electronic document to download before the electronic document may be viewed. In fact, some file formats do not permit viewing of the document until the entire file has been downloaded.

Because the present technology may separate or "fracture" an electronic document into pages, each page may be displayed substantially instantaneously with little noticeable wait time for the reader. Moreover, while the reader is viewing a page, the system may be downloading and/or processing the following pages of the electronic document transparent to the reader so that the next page requested is available quickly for viewing. In some applications, (e.g., mobile applications), only immediately requested pages may be provided so that the reader may selectively opt out of downloading an entire electronic document. This functionality allows the reader to forego paying extra data charges for downloading the entirety of the electronic document, most of which the reader may not desire to obtain.

Views of the pages may be resized to substantially fit the display of the reader without wasting display screen area, whether a given page has a landscape or portrait orientation. This gives the user a reading experience that is more like a paper, magazine, book, or other physical media, rather than a conventional web page. The systems disclosed herein may also provide the user with magnifying glass functionalities so that users may quickly zoom into sections of pages to see details.

With regard to advertising and/or marketing, the benefit of the configurations of the systems and methods may include the ability for full-page or individual advertisements to be inserted directly between the pages obtained from the electronic document. Unlike banners, pop-ups, or timed page landing advertisements, which reader may find annoying or easy to ignore, the systems and methods of the present technology make the experience of viewing these full-page advertisements similar to that of reading advertisements in a magazine. As the reader turns pages, full-page advertisements appear as they would if readers were turning the pages of a magazine. The reader gets the full impression or impact of such advertisements as they turn through the pages of a given electronic document.

Because pages obtained from electronic documents may be provided in a universally accepted and mature format, such as JPEGs which may be downloaded as pages, the size of the single pages may avoid bandwidth restrictions imposed by hardware manufacturers or wireless service providers. For example, it is common practice for hardware manufacturers to control the size of electronic documents (e.g., Flash (S.W.F.) documents or PDF documents) downloadable by certain wireless devices to conserve bandwidth.

With regard to search engine optimization (S.E.O.) systems and methods, character recognition technologies may be utilized in combination with the image conversion of electronic documents into pages. Unlike simple image conversions, once the text, fonts, and sizes are converted, they may be evaluated and ranked or "weighted" for relevance to the page. It will be understood that larger fonts are typically utilized for titles and medium-sized fonts are typically utilized in conjunction with subtitles or other important information such as text within the body of a main paragraph. Both sizes of fonts may contain keywords that may be automatically obtained from indefinite articles (e.g., "the," "and," or "a") and numbers. The keywords may then be automatically saved as metadata within the page of the electronic document from which they were extracted in a process that may be transparent to the user. Meanwhile, small fonts that typically contain only reference information that pertain to the entire electronic document may also be excluded from the metadata. These functionalities aid in preventing search engines from ignoring the pages because of textual repetition. These types of font-based character recognition optimizations may also ensure that advertisers may provide targeted advertisements to a higher yield of target audiences.

Systems and methods may include standalone reader applications that reside on end user computing systems. The standalone reader applications communicate with an application server that processes electronic documents and provides pages of the electronic document to the reader application in a format that is perceivable by a reader. Other systems and methods include web-based reader applications that cooperate with web browser applications resident on end user computing systems. The web-based reader applications may function similarly to the standalone reader applications in that the web-based reader applications communicate with an application server that processes electronic documents and provides pages of the electronic document to the reader application in a format that is perceivable by a reader.

FIG. 1 is a block diagram of an exemplary architecture 100, constructed in accordance with various embodiments of the present technology. Any number of any of elements 105-115 may be present in the architecture 100. The architecture 100 may include a plurality of computing systems 105 such as end user computing systems. It will be understood that the computing systems 105 may include computing systems such as the exemplary computing system 700 described in greater detail with regards to FIG. 7. The computing systems 105 may be operatively connected to an application server 110 via a network 115 that may include the Internet, an Intranet network such as a L.A.N. (Local Area Network) or W.A.N. (Wide Area Network), a V.P.N. (Virtual Private Network), or cloud computing systems—just to name a few.

The application server 110 may be described as a computing system adapted for the particular purpose of providing one or more pages from electronic documents by receiving requests to obtain one or more pages from an electronic document from one or more computing systems 105 quickly while conserving the amount of data transferred. It will be understood that the application server 110 may include a plurality of application servers 110 operatively connected via a load balancing device or application (not shown) resident on one or more of the application servers 110 adapted to distribute requests received from computing systems 105 to the plurality of application servers 110. The application server 110 may be adapted to obtain one or more pages of an electronic document into pages, although in some embodiments, the electronic documents may be received in an already-divided configuration. It will be understood that the term "obtained" may include extracting, separating, fracturing, splitting, or otherwise dividing the electronic document into one or more pages. The application server 110 may then evaluate the obtained pages to determine a pagination for each of the obtained pages and an order for the pages that corresponds to the order of the electronic document. Also, the application server 110 may reduce the size of each of the pages while utilizing at least a portion of the pagination of the each of the pages and associate the pages together according to the determined order. Additionally, the application server 110 may be adapted to provide at least one of the one or more of the pages to the computing system 105 from which the request was received.

According to some embodiments, the application server 110 may be adapted to extract keywords from the pages via character recognition technology and provide targeted advertisements along with, or overlaid upon, one or more of the pages provided to a computing system 105.

In other embodiments, the application server 110 may utilize font-based character recognition techniques and data filtering functions to enhance the ability of search engines to categorize the data included in the one or more pages of the electronic documents or improve the quality of targeted advertisements provided to the reader.

Figure 2:
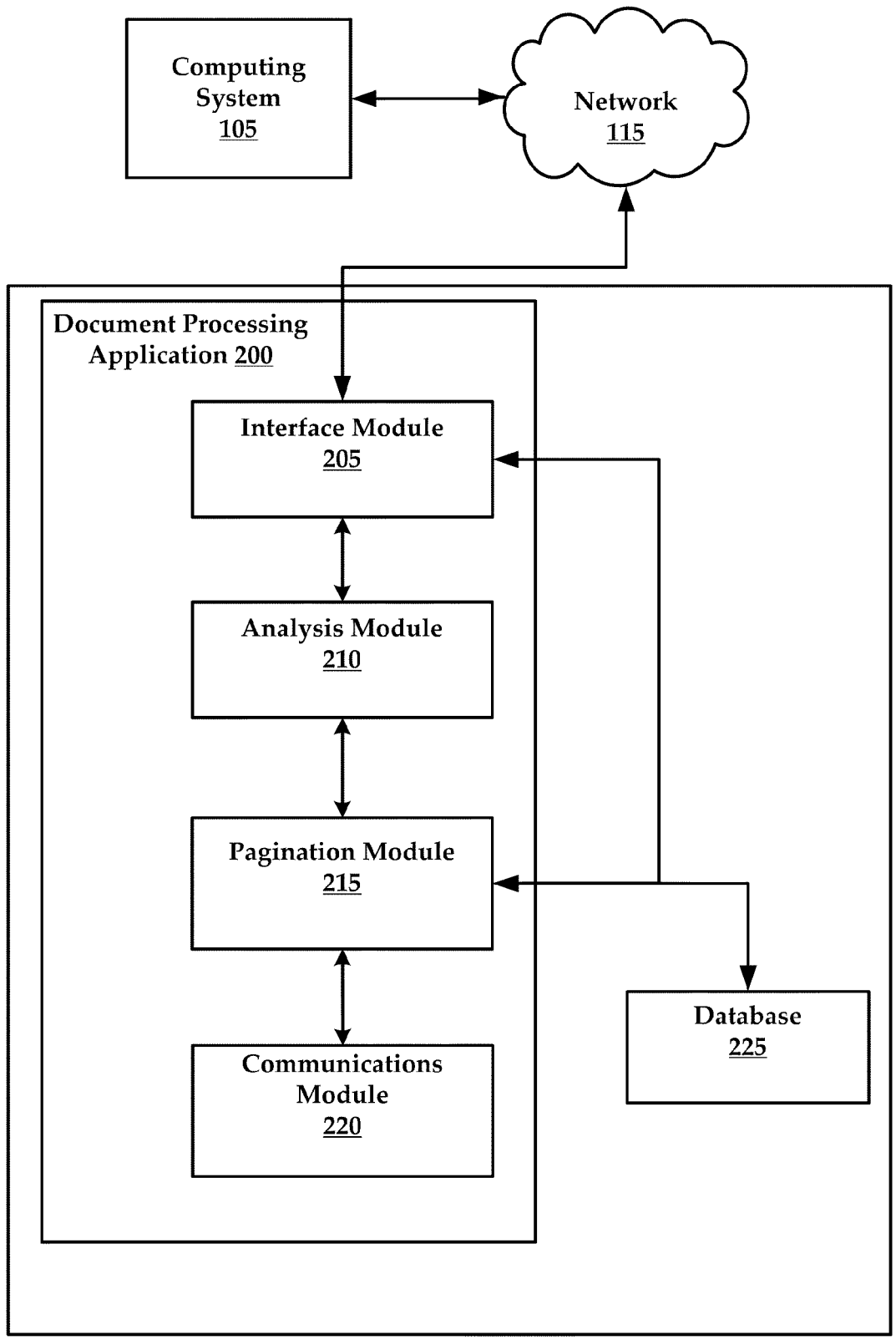
FIG. 2 is a block diagram of a document processing application constructed in accordance with various embodiments of the present technology.

Referring now to FIG. 2, application server 110 may include a document processing application, hereinafter referred to as application 200. According to some embodiments, the application 200 may include one or more modules or engines that are adapted to effectuate respective functionalities attributed thereto. It will be understood that the processor of the application server 110 may execute one or more of the constituent modules described herein.

According to some embodiments, the application 200 may include an interface module 205, an analysis module 210, a pagination module 215, a communications module 220, and a database and/or file system 225.

Generally speaking, the interface module 205 may be configured to receive requests to obtain one or more pages of an electronic document via the network 115 from a computing system 105, such as an exemplary reader computing system. In some instances, requests may be manually input by a user via an interface generated by the interface module 205.

According to other embodiments, requests received from a web browser application may interface with application 200 via an application programming interface (not shown). Generally speaking, an application programming interface allows applications residing on different platforms or written in different coding languages to interoperate. As such, the particularities of the application programming interface utilized herein are dependent, in part, upon the particular language or languages with which the application 200 and the web browser application are coded. For the sake of brevity, as the application 200 and the web browser application are not limited to any particular coding language, a detailed discussion of the use of application programming interfaces will not be provided as the creation and use of application programming interfaces would be well known to one of ordinary skill in the art with the present disclosure before them.

In various embodiments, the analysis module 210 may communicate with the interface module 205. For example, the interface module 205 may communicate a received request to the analysis module 210. In some embodiments, a request may be transmitted from the computing system 105 through the network 115 to the interface module 205 of the application server 110 for delivery to the analysis module 210. According to some embodiments, requests may include information indicative of a location of the electronic document along with information indicative of the number of pages the reader would like to obtain.

For example, the request may include information indicative of a location at which an electronic document is located, such as an Internet protocol address indicative of a domain, sub-domain, virtual sub-domain, a domain subdirectory, or the like, along with a name of the electronic document that includes the file extension, such as .txt, .pdf, .doc, .docx, .ppt, .xls, .rtf, .pst, and the like. Moreover, the request may include information indicative of the one or more pages of the electronic document that the reader would like to obtain.

Users may interact with the application server 110 via a website or application (e.g., standalone reader application resident on the computing system of the reader) that provides readers with access to electronic documents residing in an online repository (e.g., the database 225) operatively coupled to the application server 110. Readers may request specific pages from electronic documents residing on the one or more servers by inputting information into a user interface generated by the interface module 205. The interface module 205 may cause the analysis module 210 to locate electronic documents corresponding to the request. Users may also interact with the application 200 via the website to control the number or size of pages downloaded. The communications module 220 may interact with the reader platform to modulate downloads to avoid data charges.

Figure 6A:
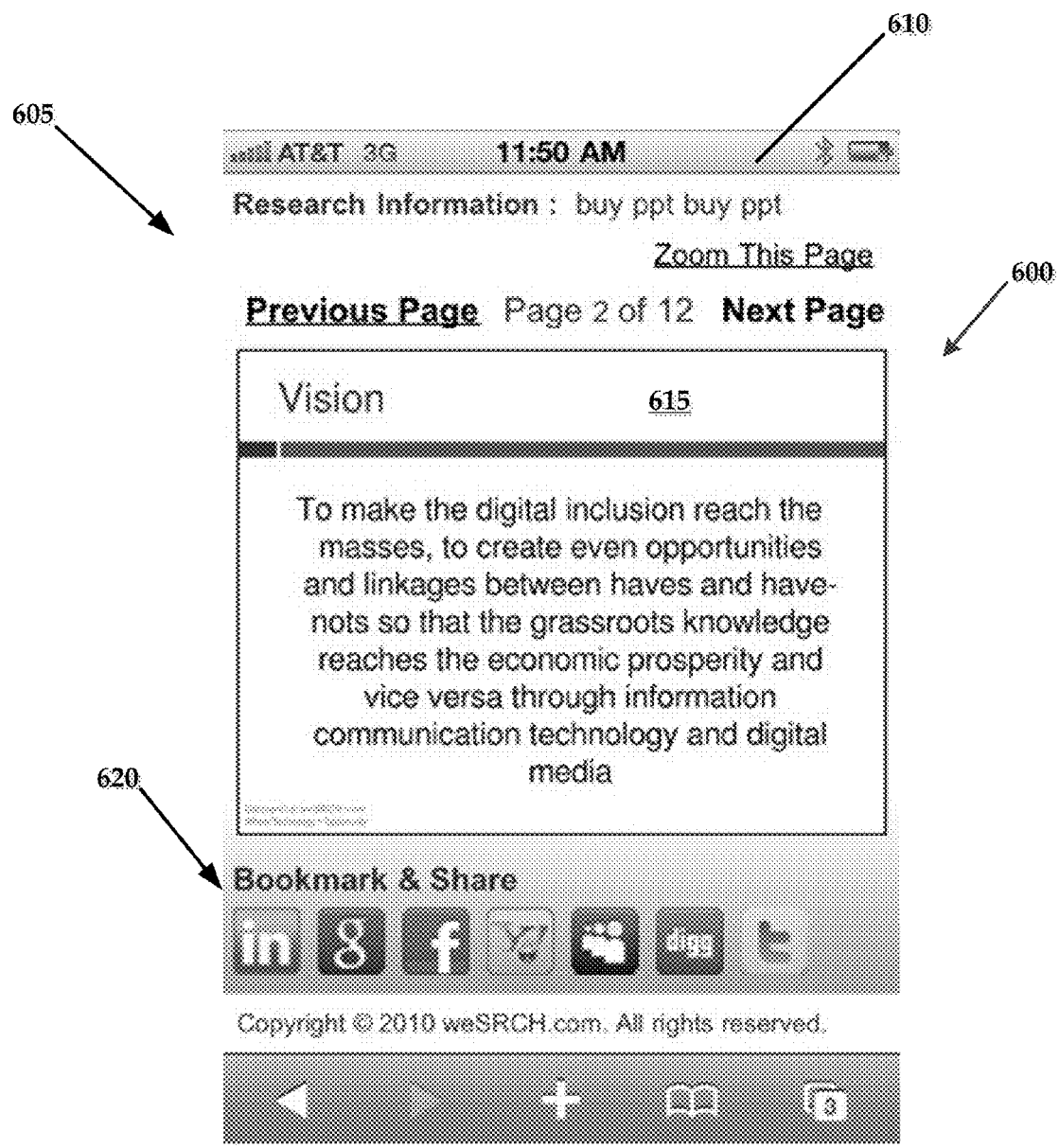
FIG. 6A illustrates an exemplary view of a user interface displayed by a wireless device, the user interface including a view of a page of an electronic document.
Figure 6B:
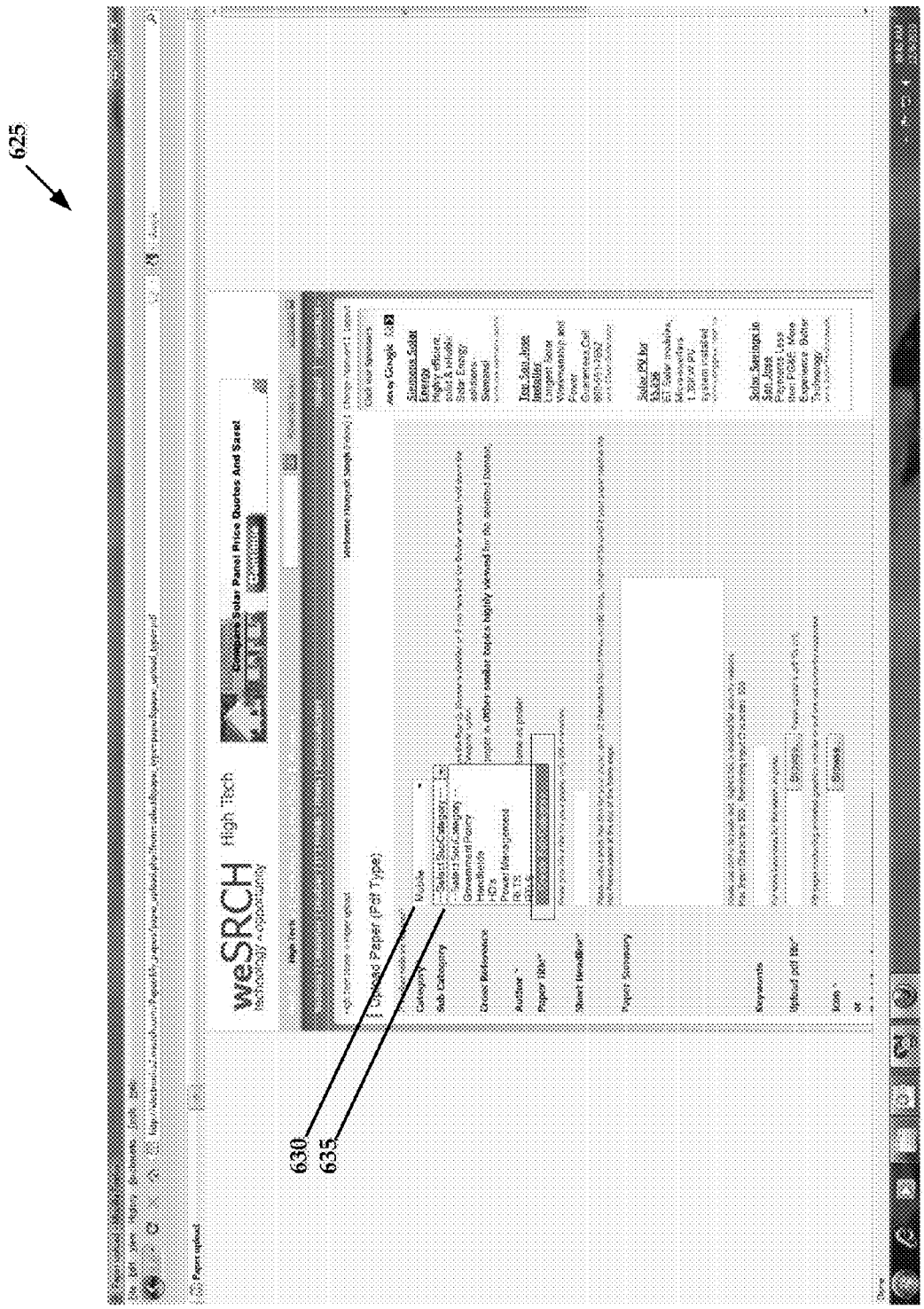
FIG. 6B illustrates an exemplary user interface in the form of a web page adapted to receive information indicative of an electronic document to be uploaded for processing.

According to other embodiments, rather than locating electronic documents in response to a request, readers may directly upload electronic documents to the application server 110 that may be processed by the application 200 (see FIG. 6B).

Next, the analysis module 210 may be adapted to determine the file format of the requested electronic document and open the same. The analysis module 210 may then evaluate the electronic document to determine break points or metadata that correspond to at least one of the beginning point or end point of each of the pages of the electronic document. For example, the analysis module 210 may be adapted to locate document data indicative of header or footer information or other reference data, such as page numbers. The analysis module 210 may also be adapted to obtain one or more pages from the electronic document based upon the break points determined previously.

According to some embodiments, the analysis module 210 may be adapted to determine an order for the electronic document that may be utilized to associate the one or more obtained pages together, as will be discussed in greater detail below. The analysis module 210 may also be adapted to determine a pagination for each of the pages of the electronic document. It will be understood that the term "pagination" may include both general and specific document layout details, such as page orientation including landscape or portrait, along with page dimensions, or object orientation information (e.g., rotation), and may also include details such as color, font, spacing, and the like.

The analysis module 210 may also be adapted to utilize character recognition technology to evaluate the textual information contained within each of the one or more pages to determine keywords. The character recognition technology may be adapted to exclude certain types of information, such as indefinite articles, numbering, or other reference characters indicative of formatting data associated with the electronic document. Additionally, the character recognition technology utilized by the analysis module 210 may be adapted to determine the characteristics of the fonts present within each of the one or more pages of the electronic document and weigh the importance of individual keywords based upon the characteristic of the fonts utilized in conjunction with the particular keyword. For example, larger, more prominent fonts (e.g., headings, titles, subtitles, etc.) associated with particular keywords may receive higher rankings relative to keywords associated with smaller or less prominent fonts (e.g., body text).

In addition to processing keywords, the analysis module 210 may also be adapted to determine categories or sub-categories of products and/or services corresponding to the extracted keywords. The categories or sub-categories may be utilized by the pagination module 215 to generate targeted advertisements that may be provided to the reader, as will be discussed in greater detail below. In other embodiments, the categories or sub-categories may be defined by, for example, a system administrator or other individual or entity tasked with maintaining the categories and sub-categories utilized by the application 200. According to some embodiments, the categories or sub-categories may be user-defined, ensuring that the information contained therein is highly relevant to the reader. It will be understood that readers may maintain their own categories and sub-categories by utilizing user interfaces generated by the interface module 205 adapted to receive electronic documents uploaded by the reader (see FIG. 6B).

Moreover, electronic document that have been processed by the application 200 described above may be stored in the online database 225 such that they are available for searching by a search engine. Because the electronic documents have been processed with font-based character recognition technology and include highly relevant metadata (e.g., keywords), search engines may locate electronic documents in a more efficient manner.

The pagination module 215 may be adapted to reduce the size of the one or more pages of the electronic document by converting them into individual image files. It will be understood that the pagination module 215 may be adapted to utilize any one of a number of standardized image file formats that would be known to one of ordinary skill in the art with the present disclosure before them such as JPEG, TIFF, and GIF—just to name a few. The reduction in file size for each of the pages facilitates the transfer and use thereof on bandwidth sensitive wireless systems.

According to some embodiments, the pagination module 215 may also be adapted to associate the one or more pages together utilizing at least one of the unique page identification information associated with each of the one or more pages by the analysis module 210 and the order of the electronic document determined by the analysis module 210. It will be understood that the pagination module 215 may associate the one or more pages according to any known method that allows the application 200 to communicate the pages in an ordered fashion. For example, the pagination module 215 may be adapted to associate each of the pages together according to at least one of unique page identification information and electronic document order in such a way that if a reader requests an individual page of an electronic document, the application 200 may provide a previous or subsequent page in its correct order relative to the original electronic document. It will be understood that the term "associating" may include any of electronically linking, connecting, relating, referencing, indexing, coupling, or otherwise interrelating the one or more pages in an orderly (e.g., sequential) fashion.

According to some embodiments, the pagination module 215 may be adapted to generate targeted advertisements based upon the keywords determined by the analysis module 210. It will be understood that in some embodiments, the pagination module 215 may not generate the targeted advertisements, but may utilize targeted advertisements generated and provided to the application 200. The targeted advertisements may be generated to have an appearance that at least partially corresponds to the pagination of the one or more pages such that the advertisement may be seamlessly disposed between two pages to simulate a full-page advertisement in a magazine or newspaper. According to other embodiments, the pagination module 215 may be adapted to overlay one or more targeted advertisements onto a portion of a page. In some embodiments, the pagination module 215 may also be adapted to apply a watermark (not shown) to one or more of the pages. The watermark may include an advertisement or information indicative of the application 200, such as a trade name.

The pagination module 215 may be adapted to generate targeted advertisements based upon the categories or sub-categories determined by the analysis module 210. For example, if the analysis module 210 locates keywords such as "Babe Ruth" and "Baseball," the analysis module 210 may determine appropriate categories such as "Major League Baseball" or "Sporting Events" corresponding to the keywords along with sub-categories such as "Baseball Memorabilia" or "Major League Baseball Ticketing." The pagination module 215 may then generate an even more broad variety of advertisements corresponding to these categories and sub-categories while ensuring that the advertisements remain targeted and appropriate relative to the reader.

After the one or more pages of the electronic document have been processed, the interface module 205 may be adapted to receive information indicative of the requested pages from the pagination module 215 and generate at least one view of the one or more pages in a format that is perceivable by a reader. For example, the views may be communicated to, and interpreted by, the web browser application resident on the computing system 105 from which the request was received (see exemplary views FIGS. 4-6A).

In accordance with the present disclosure, the interface module 205 may be adapted to dynamically adjust at least one view of the one or more pages based upon a size of a display associated with the computing system 105. For example, with regards to displaying pages of electronic documents on wireless devices, the application 200 may further subdivide the pages of a document into smaller sections and magnify the text such that the reader is not required to repeatedly manipulate the one or more pages to view details of the pages.

The application 200 may allow readers to adjust the pagination of the one or more pages of the electronic document by providing user-defined pagination modifications. For example, the reader may request that all pages be displayed in landscape orientation, despite the original pagination of the page.

It will be understood that users may also interact with the application 200 via a website to control the number and/or size of pages of an electronic document that are downloaded. The communications module 220 may interact with the computing system 105 of the reader to modulate view of the pages provided to avoid excessive bandwidth usage and resulting data charges.

According to some embodiments, the application 200 may be adapted to modulate the number of pages provided to the computing system 105 (e.g., download) to limit data transferred to the computing system 105. More specifically, the analysis module 210 may be adapted to determine, for example, the configuration of the computing system 105 from which the request was received and/or the size of the bandwidth utilized to transmit the request to determine an appropriate number of pages, which are to be provided to the computing system 105. By way of a non-limiting example, if the reader utilizes a mobile device to request five individual pages from a complex electronic document, the application 200 may restrict the number of pages provided to the mobile device to potentially one or two pages at a time. The application 200 may be adapted to provide the additional requested pages upon subsequent requests received from the reader.

More specifically, the application 200 may be adapted to recognize the magnitude of the bandwidth (e.g., bit rate or throughput) of the communications channel (such as network 115) established between the computing system 105 and the application server 110. In additional embodiments, the application 200 may be adapted to recognize the type of computing system 105 from which the request was received. For example, the application 200 may be adapted to further reduce the size of the at least one page provided to the computing system 105 if the application 200 determines that the computing system 105 is a mobile device such as a cellular telephone.

By way of non-limiting example, the application 200 may be adapted to reduce the overall size of one or more pages of the electronic document by a given factor. Thus, if a four-megabyte power point file is requested that includes 40 pages, the application 200 may be adapted to reduce the size of the converted power point file although this reduction in size may depend on the type of the electronic document and the content included therein. Therefore, if a reader decides to look at the entire electronic document, the entire size of the transfer is approximately 400 kilobytes.

It is noteworthy that because the application 200 may be adapted to provide only one page of the electronic document at a time, the reader is only paying to download a page at a time, rather than for the entirety of the electronic document that they may not want.

Figure 3A:
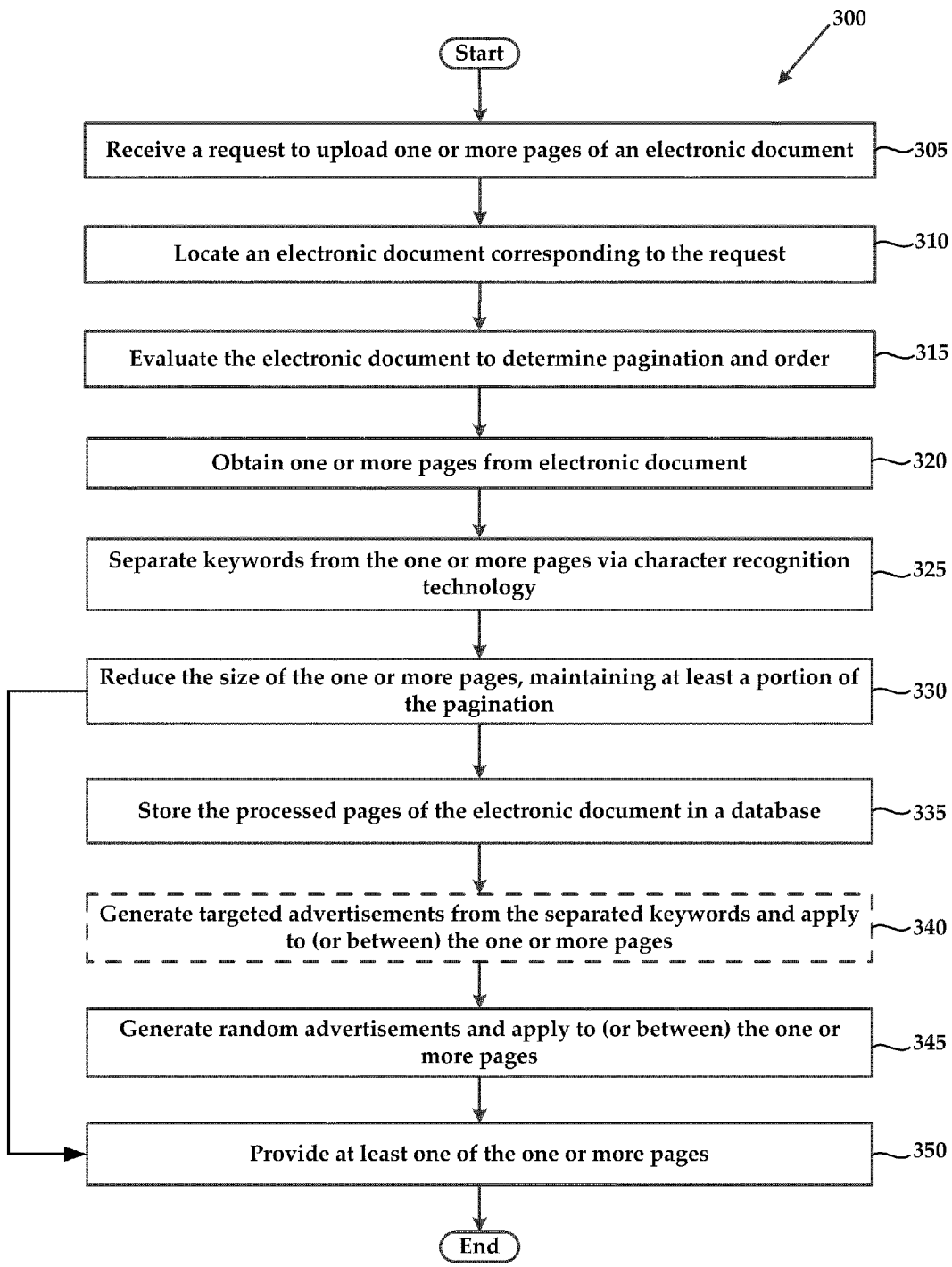
FIG. 3A is a flow diagram of an exemplary method for processing one or more pages from an electronic document.

FIG. 3A is a flow chart describing an exemplary method 300 for providing one or more pages of an electronic document. The method 300 may include the step 305 of receiving a request to obtain one or more pages from an electronic document. It will be understood that the request may be received from a computing system such as an end user computing system operated by a reader. Moreover, the request may be communicated from a web browser application resident on the computing system. The request may include identifying information indicative of an electronic document to be received. The identifying information may include a name or physical location of the electronic document, along with information indicative of the one or more pages to be obtained.

Next, in step 310, the system locates the electronic document corresponding to the identifying information received and opens the electronic document in accordance with the particular file format of the electronic document.

Additionally, in step 315, an order is determined for the electronic document such that when the one or more pages are obtained from the electronic document, they may be associated with one another in such a way that the original page order of the electronic document may be preserved. Moreover, a pagination for each of the pages of the electronic document may be determined.

In step 320, one or more pages of the electronic document may be obtained by locating break point information or metadata within the electronic document indicative of the beginning or ending points of pages of the electronic document. This step 320 may also include providing each of the one or more pages with unique identifying information such that the pages may be associated with one another in the proper order as determined in step 315. It will be understood that associating may include electronically linking, connecting, relating, referencing, indexing, coupling, or otherwise interrelating the one or more pages. It will further be understood that in some applications, the electronic documents may be received in a page-obtained format.

In an optional step 325, character recognition technology may be utilized to evaluate the data contained within the one or more pages of the electronic document. It will be understood that keywords may be obtained from the evaluated data by excluding data indicative of indefinite articles, numbers, or repetitive referencing data. It will be understood that the character recognition technology utilized may be adapted to further separate keywords from the extracted textual content based upon font characteristics attributed to particular words in the electronic document, as was described in greater detail above.

In step 330, the one or more pages may be reduced in size by converting the pages into an image file format. It will be understood that one or more of the obtained keywords may be associated with the one or more pages from which they were extracted. For example, the keywords may be included as transparent metadata or may be overlaid upon the pages in accordance with the pagination of the page.

The method may also include the step 335 of storing the processed pages of the electronic document in a database that resides on one or more servers. It will be understood that the processed pages of the electronic document may be made available for searching such that the one or more pages may be accessed again in the future without the need to reprocess the electronic document (see FIG. 3B).

According to some embodiments, the method 300 may include the additional step 340 of generating one or more targeted advertisements that are provided along with the one or more pages. The keywords determined in step 325 may be utilized as the basis for creating targeted advertisements that may be provided along with the one or more pages. For example, targeted advertisements may include individual page advertisements that are disposed between two or more pages of an electronic document provided to the reader. According to other examples, targeted advertisements may be applied to the pages directly to simulate advertisements provided to targeted audiences in a physical format such as magazines or newspapers.

In an additional step 345, one or more random advertisements may be generated and provided along with the one or more pages. In distinction to targeted advertisements, it will be understood that the term "random" may include any type of advertisement that may or may not be predicated upon keywords obtained from requested electronic documents. These random advertisements may include any type of information provided from entities such as merchants. These random advertisements may be provided in any format such as text, audio, video, or combinations thereof.

In step 350, the at least one page may be provided to the computing system from which the request was received. For example, a user interface may be generated that includes a view of the at least one page, which may be displayed by a web browser application resident on the computing system.

Figure 3B:
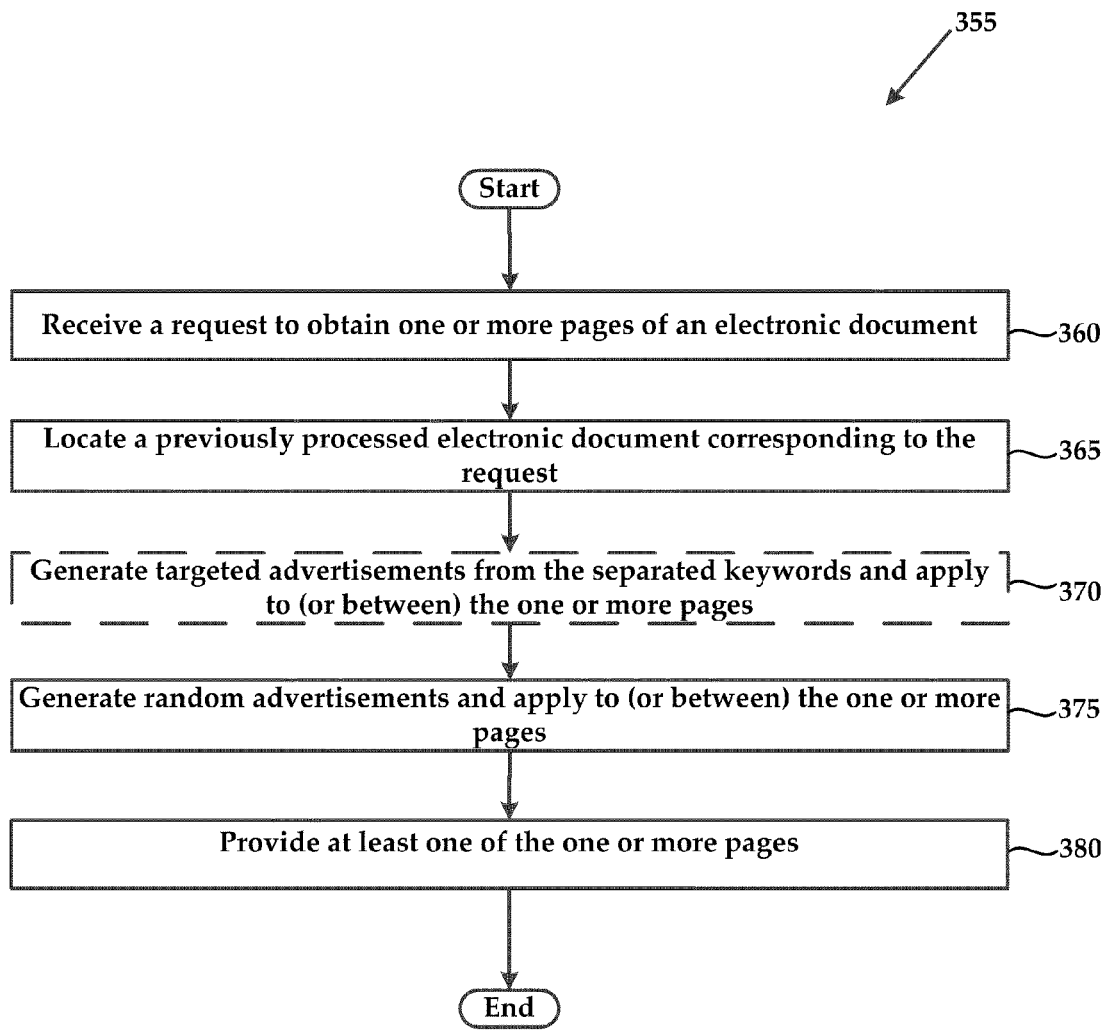
FIG. 3B is a flow diagram of an additional exemplary method for providing one or more pages from an electronic document.

FIG. 3B is a flow chart describing an additional exemplary method 355 for providing one or more pages of an electronic document. The method 300 may include the step 360 of receiving a request to obtain one or more pages from an electronic document.

Next, rather than locating and processing an unprocessed electronic document corresponding to the request, the method 355 locates a previously processed electronic document residing on a online server, in step 365. Similarly to the method 300, the method 355 may also include steps 370 and 375 of generating and providing both random and targeted advertisements, respectively. Lastly, the method 355 may include a step 380 of providing at least one page to the computing system from which the request was received.

Figure 4:
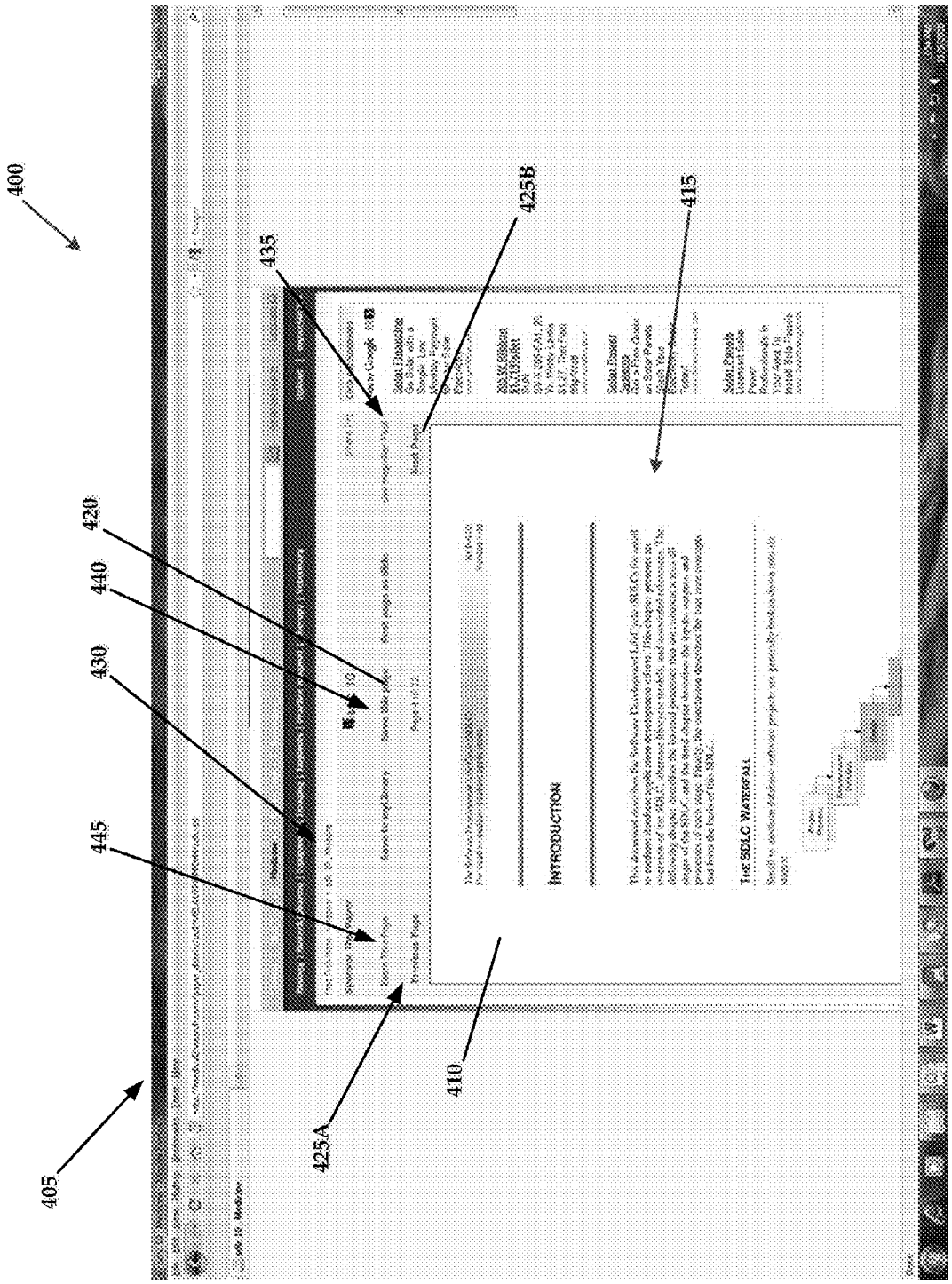
FIG. 4 illustrates an exemplary view of a user interface displayed by a web browser application including a view of a page of an electronic document.

FIG. 4 includes an exemplary user interface 400 generated by the application 200 and displayed by an exemplary web browser application 405. The user interface 400 includes of a view of a single page 410 of an electronic document, which in this case include a converted portable document file (.pdf). The individual page 410 is shown displayed within a surrounding frame 415 that may include a plurality of ancillary functionalities related to the application 200. For example, the frame 415 may include page number information 420 indicative of the order of the individual page 410 relative to the electronic document. The frame 415 may also include navigational objects 425A and 425B that allow the reader to navigate directionally through the pages of the electronic document in a sequential manner. Additionally, the frame 415 may include a save function that allows a reader to save an individual page to their local computing system 105 on which the web browser application is executing. According to some embodiments, the frame 415 may include a listing 430 of one or more keywords extracted from the individual page by the analysis module 210.

The frame 415 may also include a magnification tool object 435 that when executed displays a magnified area of a given size. Also, the frame 415 may include a zooming functionality object 445, which will be described in greater detail, along with the magnification tool object 435, below. In some embodiments, the frame 415 may also include a save object 440 which may allow users to save the page in any one of a number of formats.

Figure 5:
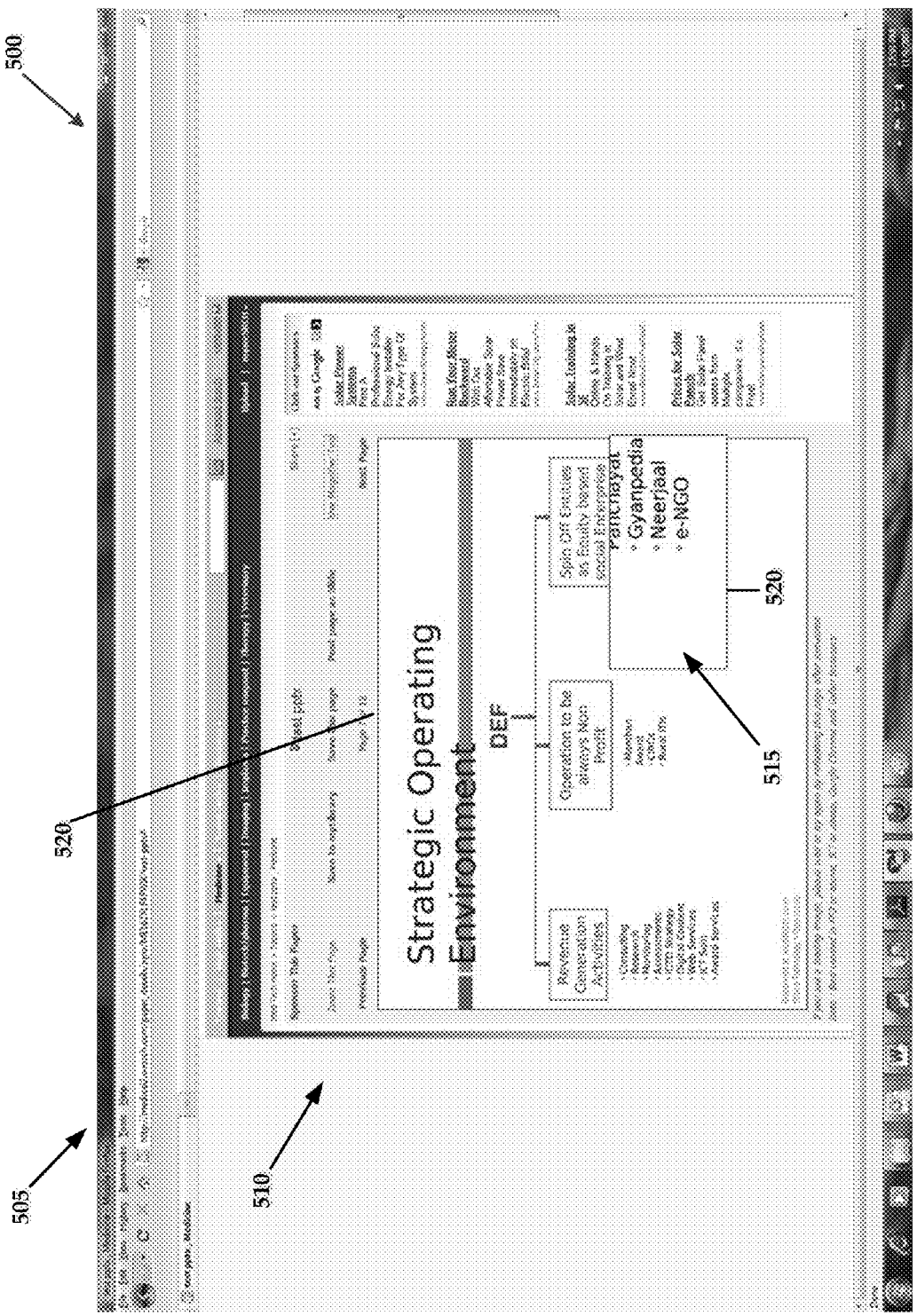
FIG. 5 illustrates an exemplary view of a user interface displayed by a web browser application including a view of a page of an electronic document showing a magnified area.

FIG. 5 illustrates an exemplary user interface 500 generated by the application 200 and displayed by an exemplary web browser application 505. The user interface 500 includes of a view of a page 510 of an electronic document, which in this case include a power point document (.ppt) file type. The magnification functionality may generate a magnified area 515 defined by a boundary 520. The magnified area 515 may be repositionable along the currently being viewed individual page to magnify any section of the page. It will be understood that the application 200 may be adapted to determine pixels within the X and Y coordinates included within the magnified area 515 and enlarge the selected pixels within the magnified area 515 without substantially compromising (e.g., distorting, stretching, etc.) the quality of the representation of the data within the magnified area 515. The magnified area 515 may be selectively positionable across any portion of the page 510 by way of an input device such as a mouse operated by a reader.

The zooming functionality object 445 (FIG. 4) of the application 200 may operate similarly to the magnification tool object 435 (FIG. 4), with the exception that rather than magnifying a selected area of the individual page, the zooming functionality object 445 is adapted to increase or decrease the size of the entire individual page.

FIG. 6A illustrates an exemplary user interface 600 generated by the application and communicated to an exemplary application 605 executable on a wireless device 610. The user interface 600 includes of a view of a page 615 of an electronic document, which in this case include a converted power point document (.ppt) file type. It will be understood that the exemplary application 605 may include a web browser application or any one of a number of other types of applications adapted to display views of pages of electronic documents processed and generated by the application 200 that would be known to one of ordinary skill in the art with the present disclosure before them.

The exemplary user interface 600 may include a plurality of objects such as the one described in greater detail with regards to exemplary user interfaces 400 and 500 with respect to FIGS. 4 and 5, respectively.

Additional functional objects may include icons 620 adapted to provide direct access to social networking websites. Readers may reference to, share, upload or otherwise post pages currently being viewed by clicking the appropriate icon 620.

FIG. 6B illustrates an exemplary user interface in the form of a web page 625 adapted to allow users to upload electronic documents for processing by the application 200 and input information indicative of the electronic document. The web page 625 may be adapted to receive input indicative of available categories and/or user-defined sub-categories indicative of the electronic document. The web page 625 may include one or more data input objects such as a first dropdown box 630 adapted to receive information indicative of categories such as "mobile" devices or applications. Based upon the selection received by the first dropdown box 630, a second dropdown box 635 may be populated with a plurality of selections associated with the category of "mobile" such as, "government policy," "handhelds," "HD's," "Power Management," and the like.

The web page 625 may also include a plurality of other input objects adapted to receive metadata indicative of the electronic document such as author, title, headline, summary, or any combinations thereof.

Although not shown, an additional non-limiting example of a document processing application may include a standalone device such as an electronic document reader device that may be adapted to provide one or more one or more pages of an electronic document. According to some embodiments, the device may include a housing that at least partially houses at least one of a display, a memory for storing a document processing application, a processor for executing the document processing application, and a transceiver for sending and receiving information. In some embodiments, the document processing application may include an interface module adapted to receive requests to obtain one or more pages of an electronic document and provide views of the individual pages of the electronic document and a communications module adapted to locate and obtain the requested electronic document from a server.

The document processing application may also include an analysis module adapted to evaluate one or more pages obtained from the electronic document to determine at least one of a pagination for each of the one or more pages and an order for the one or more pages. Additionally, the application may include a pagination module adapted to reduce the size of each of the one or more pages while utilizing at least a portion of the original pagination of the each of the one or more pages and associate the one or more pages according to the determined order. The application may also include an interface module adapted to generate views of one or more of the requested pages.

In accordance with the present invention, the display of the electronic reader may include a touch screen adapted to receive touch gestures from the reader that may be associated with functions that control the application. It will be understood that touch gestures may include gliding, pinching, sliding, swiping, and taping—just to name a few.

In alternative operational implementation, the application 200 previously disclosed herein may include a standalone reader application, executable locally on the end user's computing system. Readers may direct requests through a web browser to locate one or more electronic documents that correspond to particular keywords. It will be understood that the reader may search the Internet via a search engine accessible from the web browser. The search engine may return a list of links, some of which correspond to electronic documents residing on servers located remotely from the computing system utilized by the reader. Clicking a link corresponding to the electronic document may cause the application 200 execute and process the electronic document to provide the user with views of one or more pages of the electronic document that include one or more of the keywords included in the request.

Figure 7:
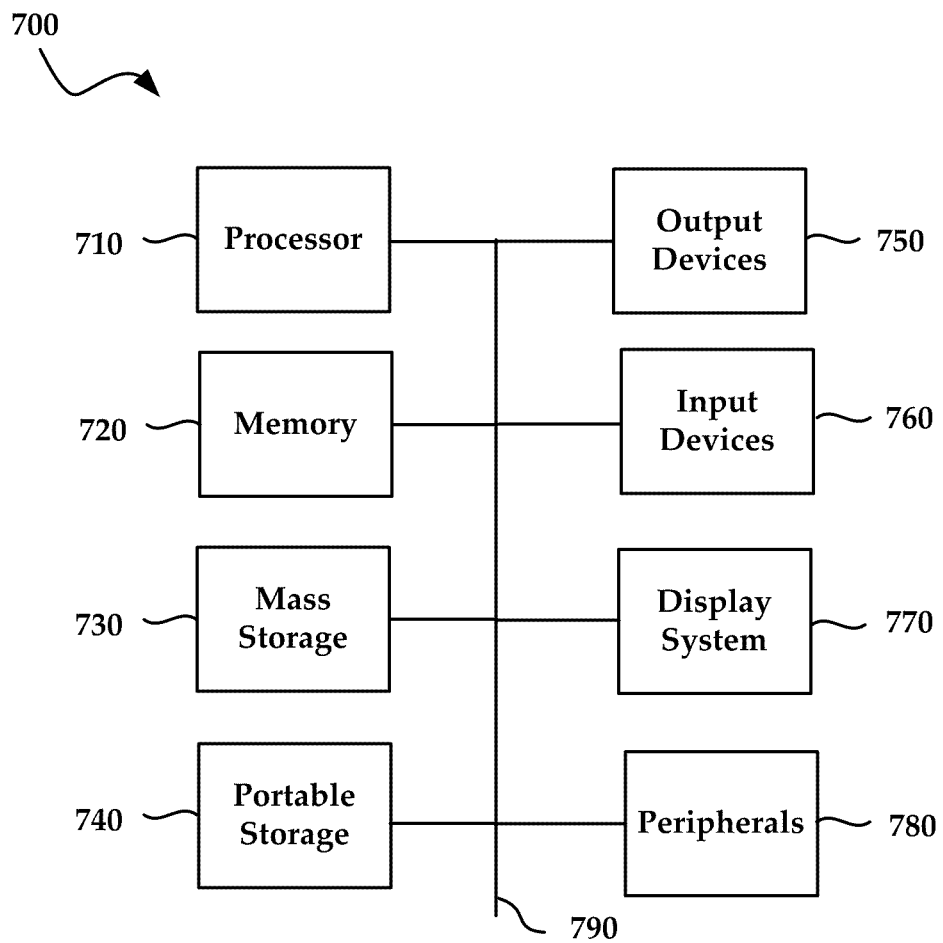
FIG. 7 is a block diagram of an exemplary computing system for implementing embodiments of the present technology.

FIG. 7 illustrates an exemplary computer system 700 that may be used to implement an embodiment of the present technology. The system 700 of FIG. 7 may be implemented in the contexts of the likes of computing systems, networks, servers, or combinations thereof. The computer system 700 of FIG. 7 includes one or more processors 710 and main memory 720. Main memory 720 stores, in part, instructions and data for execution by processor 710. Main memory 720 may store the executable code when in operation. The system 700 of FIG. 7 further includes a mass storage device 730, portable storage devices 740, output devices 750, input devices 760, a display system 770, and peripheral devices 780.

The components shown in FIG. 7 are depicted as being connected via a single bus 790. The components may be connected through one or more data transport means. Processor 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor 710. Mass storage device 730 may store the system software for implementing embodiments of the present invention for purposes of loading that software into main memory 720.

Portable storage device 740 operates in conjunction with a portable non-volatile storage medium, such as a floppy disk, compact disk, digital video disc, or USB storage device, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alphanumeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripheral devices 780 may include any type of computer support device to add additional functionality to the computer system. Peripheral device(s) 780 may include a modem or a router.

The components provided in the computer system 700 of FIG. 7 are those typically found in computer systems that may be suitable for use with embodiments of the present invention and are intended to represent a broad category of such computer components that are well known in the art. Thus, the computer system 700 of FIG. 7 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing one or more pages of an electronic text document, the method comprising:

receiving a request from a network-enabled computing system to obtain one or more specific pages of an electronic text document using an interface module of a server;

evaluating the electronic text document to detect the original pagination and an order for each of the pages of the electronic text document, using an analysis module of the server;

obtaining the one or more pages from the electronic text document, the pagination and order of the obtained pages corresponding to the pagination and order of the electronic text document;

converting each of the one or more pages of the electronic text document into an individual image file using a pagination module of the server;

extracting keywords from the individual converted page image files using character recognition technology to:

recognize both text characters of the keywords and font characteristics of the text characters in the individual converted page image files, exclude advertising categories based on extracted keywords recognized in the individual converted page image files that are of a first font characteristic recognized using character recognition technology, and include advertising categories based on extracted keywords recognized in the individual converted page image files that are of a second font characteristic recognized using character recognition technology;

reducing the size of the converted page images based on a size of a display associated with the network-enabled computing system and the detected pagination of the electronic text document;

associating the one or more pages that have been reduced in size together according to the detected order of the pages in the electronic text document, using the pagination module; and providing one of the one or more pages and metadata from keywords.

2. The method according to claim 1, further comprising:
recognizing the bandwidth between the server and the network enabled computing system; and
limiting a number of the requested one or more pages provided to the network-enabled computing system for display based on the bandwidth.

3. The method according to claim 1, further comprising receiving a request to obtain a specific one or more pages of an electronic text document before the step of evaluating.

4. The method according to claim 1, the character recognition technology used to extract textual content excludes words based on font size.

5. The method according to claim 4, further comprising including the extracted textual content as keywords that are applied to the one or more pages from which the textual content was extracted.

6. The method according to claim 1, further comprising storing the extracted keywords as metadata within the pages from which the textual content was extracted.

7. The method according to claim 6, further comprising excluding at least one of indefinite articles, numbers, and reference data from being included as metadata.

8. The method according to claim 7, wherein evaluating further includes ranking the importance of extracted textual content based upon at least one of the font, size, location, and color thereof.

9. The method according to claim 1, further comprising receiving one or more user-defined pagination modifications that are utilized to adjust the pagination of each of the one or more pages.

10. The method according to claim 1, further comprising:
generating a targeted full-page advertisement based on keywords extracted using character recognition technologies from the one or more pages, the targeted full-page advertisement having an appearance that at least partially corresponds to the pagination of the pages from which the keywords were extracted; and inserting the targeted full-page advertisement between a page provided to the network-enabled computing system and another of the one or more pages from which keywords were extracted.

11. The method according to claim 1, further comprising:
generating a targeted full-page advertisement from keywords extracted from the one or more pages using character recognition technologies, the targeted full page advertisement having an appearance that at least partially corresponds to the pagination of a page from which the keywords were extracted; and
disposing the targeted full-page advertisement between two pages provided to the network-enabled computing system.

12. The method according to claim 1, wherein evaluating includes detecting at least one of break points and metadata indicative of at least one of a beginning point or an end point for each of the one or more pages of the electronic text document.

13. The method according to claim 1, wherein evaluating further includes detecting blank pages in the electronic text document which are excluded from the step of reducing.

14. The method according to claim 1, further comprising applying a watermark to each of the one or more pages.

15. The method according to claim 1, further comprising providing each of the one or more pages of the electronic text document with a unique page identification information utilized for associating the one or more pages according to the detected order of the pages in the electronic text document.

16. A system for providing one or more pages of an electronic text document, the system comprising:
a memory for storing a document processing application;
a processor for executing the document processing application, the document processing application including:
a server configured to obtain the one or more pages of an electronic text document having a pagination;
an analysis module adapted to:
evaluate the electronic text document to detect an original pagination and an order within the electronic text document for each of the obtained pages;
a pagination module adapted to:
convert each of the obtained pages of the electronic text document into an individual page image file;
extract keywords from the individual converted image files of the converted pages using character recognition technology to:
recognize both text characters keywords and font characteristics of the text characters in the individual converted page image files,
exclude advertising categories based on extracted keywords that are of a first font characteristic, and
include advertising categories based on extracted keywords that are of a second font characteristic;
reduce the size of each of the converted page images based on at least a portion of the detected pagination of the each of the one or more converted page images, and
associate the one or more converted page image files together according to the detected order in the electronic text document; and
an interface module adapted to provide at least one of the one or more pages to a network-enabled computing system.

17. The system according to claim 16, wherein the interface module is adapted to modulate a number of pages provided to the network-enabled computing system based upon at least one of a bandwidth of a communications channel established between the network-enabled computing system and the system, and a network-enabled computing system type.

18. The system according to claim 16, wherein the interface module is further adapted to receive requests to obtain one or more specific pages of an electronic text document from the network-enabled computing system before the analysis module locates and evaluates the one or more pages of the electronic text document.

19. The system according to claim 16, wherein the pagination module is further adapted to utilize character recognition technology to recognize size as a font characteristic and extract keywords based on font size.

20. The system according to claim 16, wherein the pagination module is adapted to include the extracted keywords as metadata to the each of the one or more pages of the electronic text document from which the keywords were extracted.

21. The system according to claim 20, wherein the pagination module is further adapted to exclude indefinite articles, numbers, and reference data from the metadata applied to the one or more pages from which the keywords were extracted.

22. The system according to claim 16, wherein the pagination module is adapted to utilize user-defined pagination modifications utilized to adjust the pagination of each of the one or more pages.

23. The system according to claim 16, wherein the analysis module is adapted to evaluate the electronic text document to detect at least one of break points and metadata indicative of at least one of a beginning point or an end point for each page of the electronic text document.

24. The system according to claim 16, wherein the analysis module is further adapted to detect blank pages of the electronic text document, which are excludable by the pagination module.

25. The system according to claim 16, wherein the pagination module is adapted to apply a watermark to each of the one or more pages.

26. The system according to claim 16, wherein the pagination module is further adapted to:
   generate one or more targeted advertisements from keywords extracted from the one or more pages; and
   apply one or more targeted advertisements to one or more pages from which textual content was extracted.

27. The system according to claim 26, wherein the pagination module is adapted to insert one or more targeted advertisements between two pages provided to the network-enabled computing system.

28. The system according to claim 27, wherein the one or more targeted advertisements have an appearance that substantially corresponds to the appearance of a page from which a keyword was extracted.

29. The system according to claim 16, wherein the analysis module is adapted to provide each of the one or more pages with a unique page identification information detected in the electronic text document that is utilized by the pagination module to associate the one or more pages together according to the detected order of the pages in the electronic text document.

30. The system according to claim 18, wherein the interface module is further adapted to dynamically adjust the at least one view of the one or more pages based upon a size of a display associated with the network-enabled computing system from which the request was received.

31. A non-transitory computer readable storage medium having a document processing application embodied thereon, the document processing application executable by a processor of a computing system to perform a method for providing one or more pages of an electronic text document, comprising:
   evaluating an electronic text document having a pagination to detect at least one of the pagination and an order for each of a plurality of pages of the electronic text document;
   converting each of the pages of the electronic text document into an individual image file the pagination and order of the converted pages corresponding to the pagination and order of the electronic, document;
   extracting keywords from the individual converted page image files using character recognition technology to:
      recognize both text characters of the keywords and font characters of the text characters in the individual converted page image files,
      exclude advertising categories based on extracted keywords recognized in the individual converted page image files that are of a first font characteristic recognized using character recognition technology, and
      include advertising categories based on extracted keywords recognized in the individual converted page image files that are of a second font characteristic recognized using character recognition technology;
   reducing the size of each of the converted page images, while retaining the pagination of the converted pages;
   associating the reduced pages together according to the detected order of the corresponding pages in the electronic text document; and
   providing one or more of the reduced pages to a network-enabled computing system upon receiving a request to obtain a corresponding one or more pages of the electronic text document from the network-enabled computing system.

32. An electronic document reader device adapted to provide one or more pages of an electronic text document, the device comprising:
   a memory for storing a document processing application;
   a processor for executing the document processing application, the document processing application including:
      an interface module adapted to receive requests to obtain one or more specific pages of an electronic text document having a pagination;
      a communications module adapted to locate and obtain the requested electronic text document from a server;
      an analysis module adapted to:
         evaluate the electronic text document to detect at the pagination and an order for each of the pages of the electronic text document; and
      a pagination module adapted to:
         convert on or more of the detected pages of the electronic text document into an individual image file;
         extract keywords from the individual converted image files of the converted pages using character recognition technology to recognize both text characters keywords and font characteristics of the text characters in the individual converted page image files;
         reduce the size of the converted image page files based on a portion of the detected pagination of the electronic text document; and
         associate the converted image page files according to the detected order; and
      wherein the interface module is further adapted to generate a view of at least one page;

a transceiver for outputting requests to obtain one or more pages of an electronic text document and receive the at least one view of at least one page from the interface module; and a display adapted to output the view generated by the interface module of the document processing application.

33. The device according to claim 32, wherein the display includes a touch screen adapted to receive touch gestures, wherein touch gestures are associated with functions that control the document processing application.

* * * * *